(12) United States Patent
Kristinsson et al.

(10) Patent No.: US 9,459,110 B2
(45) Date of Patent: Oct. 4, 2016

(54) ADAPTIVE INITIAL ESTIMATION AND DYNAMIC DETERMINATION AND UPDATE OF DISTANCE UNTIL CHARGE OF A PLUG-IN HYBRID ELECTRIC VEHICLE

(75) Inventors: Johannes G. Kristinsson, Ann Arbor, MI (US); Hai Yu, Canton, MI (US); Ryan A. McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1434 days.

(21) Appl. No.: 13/007,729

(22) Filed: Jan. 17, 2011

(65) Prior Publication Data

US 2011/0184600 A1    Jul. 28, 2011

Related U.S. Application Data

(60) Provisional application No. 61/297,880, filed on Jan. 25, 2010.

(51) Int. Cl.
*G01C 21/34* (2006.01)
*B60L 11/18* (2006.01)

(52) U.S. Cl.
CPC ........ *G01C 21/3469* (2013.01); *B60L 11/1862* (2013.01); *Y02T 10/7005* (2013.01); *Y02T 10/705* (2013.01); *Y02T 10/7044* (2013.01); *Y02T 90/14* (2013.01); *Y02T 90/161* (2013.01)

(58) Field of Classification Search
CPC .................. G01C 21/3469; B60L 11/1862
See application file for complete search history.

(56) References Cited

U.S. PATENT DOCUMENTS

| | | |
|---|---|---|
| 5,539,399 A | 7/1996 | Takahira et al. |
| 5,778,326 A | 7/1998 | Moroto et al. |
| 5,815,824 A | 9/1998 | Saga et al. |
| 6,242,873 B1 | 6/2001 | Drozdz et al. |
| 7,659,698 B2 | 2/2010 | Elder et al. |
| 2002/0188387 A1 | 12/2002 | Woestman et al. |
| 2004/0204797 A1* | 10/2004 | Vickers ............................ 701/1 |
| 2005/0154508 A1 | 7/2005 | Honda |
| 2005/0228553 A1 | 10/2005 | Tryon |
| 2007/0112484 A1 | 5/2007 | Lee |
| 2008/0021628 A1 | 1/2008 | Tryon |
| 2008/0084186 A1 | 4/2008 | Elder et al. |
| 2008/0093136 A1 | 4/2008 | Miller |
| 2008/0262667 A1 | 10/2008 | Otabe |
| 2008/0319597 A1* | 12/2008 | Yamada ......................... 701/22 |
| 2009/0114463 A1 | 5/2009 | DeVault |
| 2010/0017249 A1* | 1/2010 | Fincham et al. ................. 705/8 |

FOREIGN PATENT DOCUMENTS

| EP | 0548748 B1 | 9/1995 |
|---|---|---|
| KR | 20040022743 A | 3/2004 |

* cited by examiner

*Primary Examiner* — Basil T Jos
(74) *Attorney, Agent, or Firm* — David B. Kelley; Brooks Kushman P.C.

(57) ABSTRACT

An electric vehicle such as a PHEV or a BEV and a method of control includes receiving from a user of the vehicle, at an interface of the vehicle, a distance until charge (DUC) value indicative of the distance from a current position that the vehicle is intended to be driven before the vehicle is recharged. Battery usage of the vehicle is controlled as a function of the DUC value. An initial estimate of the DUC value may be made by obtaining historical distance between charges (DBC) values indicative of the distance the vehicle has been driven between each of one or more pairs of consecutive charges of the vehicle. The estimated DUC value is based on the DBC values.

18 Claims, 6 Drawing Sheets

ADAPTIVE INITIAL ESTIMATION AND DYNAMIC DETERMINATION AND UPDATE OF DISTANCE UNTIL CHARGE OF A PLUG-IN HYBRID ELECTRIC VEHICLE

CROSS-REFERENCE TO RELATED APPLICATIONS

This application claims the benefit of U.S. Provisional Application No. 61/297,880, filed Jan. 25, 2010; which is hereby incorporated by reference in its entirety.

BACKGROUND

1. Technical Field

The present invention relates to a plug-in hybrid electric vehicle and a method of control.

2. Background Art

Plug-in hybrid electric vehicles (PHEV) are an extension of existing hybrid electric vehicle (HEV) technology, in which an internal combustion engine is supplemented by an electric battery and an electric machine to obtain increased fuel mileage and reduced vehicle combustion gas emissions. A PHEV has a larger capacity battery than a conventional HEV. A PHEV has the capability to recharge the battery from an external electric grid to decrease fuel consumption and to improve the vehicle's fuel economy in both a fuel/electric blended driving mode and an electric driving mode.

Conventional HEVs buffer fuel energy and recover kinematic energy in electric form to improve the overall vehicle system operating efficiency. Fuel is the principal energy source. For PHEVs, there is an additional source of energy—the amount of electric energy stored in the battery from the grid after each battery charge event.

While most conventional HEVs are operated to maintain a battery state of charge (SOC) around a constant charge level, PHEVs use as much pre-saved battery electric energy as possible before the next battery charge event; i.e. the relatively low cost grid supplied electric energy is expected to be fully used for propulsion and other vehicle functions after each charge. After the battery SOC decreases to a low conservative level during a given driving event, the PHEV resumes operation as a conventional HEV in a so-called charge sustaining mode.

To this end, two basic operating modes for a PHEV include a charge depleting (CD) mode and a charge sustaining (CS) mode. During a first travel distance after a charge, the fully/partially charged PHEV is driven in CD mode, where primarily the battery electric energy is used to propel the vehicle, gradually depleting the battery's electric energy. Once the battery SOC decreases to a predefined charge sustaining SOC level, the vehicle switches to CS mode, where the battery SOC is kept within a certain range around the charge sustaining SOC level and the vehicle is mainly powered, for example, by a gasoline engine (fuel energy), as is done in a conventional HEV.

The CD range is the distance a fully charged PHEV can travel in CD mode before the energy utilization pattern switches to the CS mode. By primarily using the battery electric energy to propel the vehicle, the fuel consumption will be minimized (blended CD mode). The vehicle may even operate with no gasoline fuel cost (all-electric CD mode), especially when the trip distance is less than or close to the CD range (~30-60 miles in a typical design in multiple driving cycles). This control strategy is called base PHEV charge depletion strategy.

PHEVs desire to use as much pre-saved grid energy as possible before arriving at the destination; i.e., the grid supplied electric energy is expected to be totally utilized for propulsion. In some applications, however, a driver may like to save a certain amount of battery electric power for purposes other than for driving power.

The fuel economy of a PHEV can be optimized if the battery usage is adapted for the exact distance that the vehicle will be driven until the next charge. A standard approach has been to use a fixed (default) distance.

SUMMARY

In an embodiment, a method for controlling an electric vehicle such as a plug-in hybrid electric vehicle (PHEV) or a battery electric vehicle (BEV) is provided. The method includes controlling battery usage of the vehicle as a function of a distance until charge (DUC) value. In one variation, the DUC value is estimated based on historical distance between charges (DBC) values indicative of the distance the vehicle has been driven between each of one or more pairs of consecutive charges of the vehicle. In another variation, the DUC value is received from a user of the vehicle at an interface of the vehicle.

In an embodiment, a system for controlling an electric vehicle such as a PHEV or a BEV is provided. The system includes a controller and an arbitrator in communication with the controller. The arbitrator is configured to receive from a user of the vehicle a distance until charge (DUC) value indicative of the distance from a current position that the vehicle is intended to be driven before the vehicle is recharged. The controller is configured to control battery usage of the vehicle as a function of the DUC value.

DETAILED DESCRIPTION

As indicated above, the fuel economy of a plug-in hybrid electric vehicle (PHEV) can be optimized if the battery usage is adapted for the exact distance that the vehicle will be driven until the next charge. A standard approach has been to use a fixed (default) distance. If the distance could be automatically adjusted to fit the actual driving patterns of the vehicle, then the overall fuel economy would automatically improve.

The distance the vehicle is driven between two charges is referred to herein as the "Distance between Charges" (DBC). The DBC is historical data that can be known after a charge has been initiated.

The "Distance until Charge" (DUC) referred to herein is an estimation that reflects how far from the current position that the vehicle is intended to be driven before it receives a recharge. The DUC is used by a battery usage optimization system (referred to herein as a "Distance-based Battery Charge Depletion control" (DBCD control)) to optimize the battery usage. The battery usage optimization system (i.e., the DBCD control) is implemented by, for example, the vehicle system controller of the PHEV.

According to an embodiment of the present invention, an optimal initial estimation of the DUC to be used by the DBCD control is made when the vehicle is started after a charge. The initial DUC estimation is based on statistical information of historical distances between charges (DBC). The initial estimation of the DUC is made after each recharge for the battery usage optimization system.

According to another embodiment of the present invention, the DUC is dynamically determined and updated while the vehicle is being operated. The DUC is determined and updated based on driver provided information and/or navigation system information while the vehicle is being operated. This embodiment makes use of the driver being a source of information on how the vehicle is intended to be used. The driver, together with a trip facilitation system such as a navigation system, may communicate with the battery control algorithms to update the battery usage optimization system.

It is briefly noted that while both embodiments have been generally described above with reference to a PHEV, both embodiments are applicable to other electric vehicles such as a battery electric vehicle (BEV) or any other vehicle type where "re-fuelling" is performed the same way as "charging" (i.e., a slow process that happens regularly at one main location).

Figure 1:
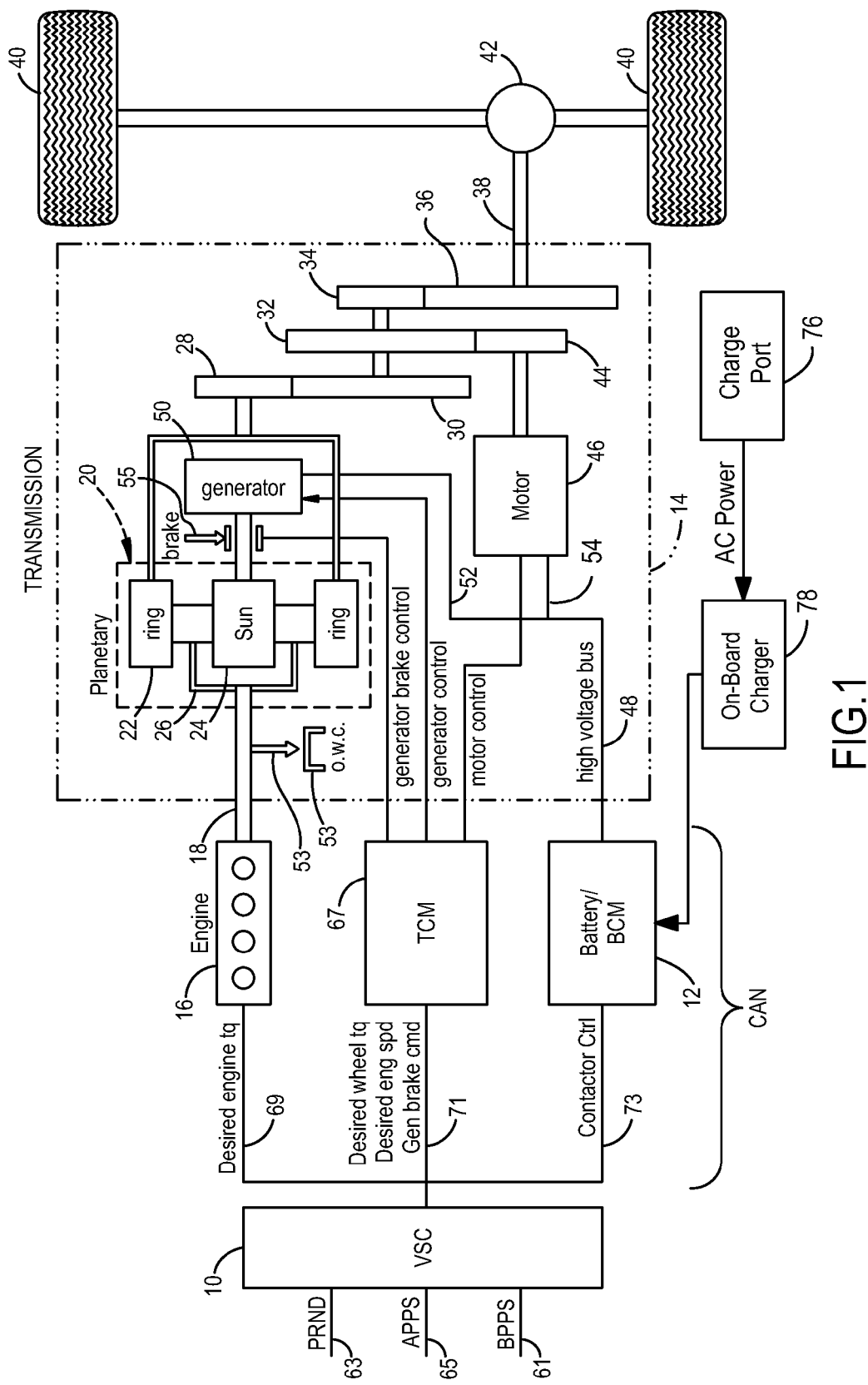
FIG. 1 illustrates a schematic representation of a plug-in hybrid electric vehicle (PHEV) powertrain capable of embodying the present invention.

Referring now to FIG. 1, a schematic representation of a plug-in hybrid electric vehicle (PHEV) powertrain capable of embodying the present invention is shown. This powertrain is a power split HEV powertrain in which a planetary arrangement 20 is used. There are two power sources that are connected to the driveline: 1) a combination of an engine 16 and generator subsystems using planetary arrangement 20 to connect to each other, and 2) the electric drive system (a battery 12, an electric motor 46, and a generator 50). Battery 12 is an energy storage system for motor 46 and generator 50.

Battery 12 is rechargeable from a power source residing external the vehicle (e.g., an external electric grid). Battery 12 periodically receives AC electrical energy from the grid via a charge port 76 connected to the grid. An on-board charger 78 receives the AC electrical energy from charge port 76. Charger 78 is an AC/DC converter which converts the received AC electrical energy into DC electrical energy suitable for charging battery 12. In turn, charger 78 supplies the DC electrical energy to battery 12 in order to charge battery 12 during the recharging operation.

A vehicle system controller (VSC) 10, battery 12, and a transmission 14, together with the motor-generator subsystem, comprise a control area network (CAN).

Controller 10 is configured to send control signals to and receive sensory feedback information from one or more of battery 12, engine 16, motor 46, and generator 50. Controller 10 can monitor the amount of electrical energy stored at battery 12 (e.g., the state-of-charge (SOC) of the battery). In this way, controller 10 can control the operation of battery 12 and engine 16 for propelling the vehicle as a function of the amount of electrical energy stored at battery 12 and other variables.

Engine 16, controlled by controller 10, distributes torque through torque input shaft 18 to transmission 14.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to vehicle traction wheels 40 through a differential-and-axle mechanism 42.

Gears 30, 32, and 34 are mounted on a counter shaft with gear 32 engaging a motor-driven gear 44. Motor 46 drives gear 44, which acts as a torque input for the counter shaft gears 30, 32, 34.

Battery 12 delivers electric power to motor 46 through power flow path 48. Generator 50 is connected electrically to battery 12 and to motor 46, as shown at 52.

While battery 12 is acting as a sole power source with engine 16 off, torque input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65.

A brake pedal position sensor (BPPS) distributes a wheel brake signal to controller 10, as shown at 61. TCM 67 issues a generator brake control signal to generator brake 55. TCM 67 also distributes a generator control signal to generator 50.

As described, the powertrain has a primary power source which includes engine 16 and a secondary power source which includes a combination of battery 12, motor 46, and generator 50.

Figure 2:
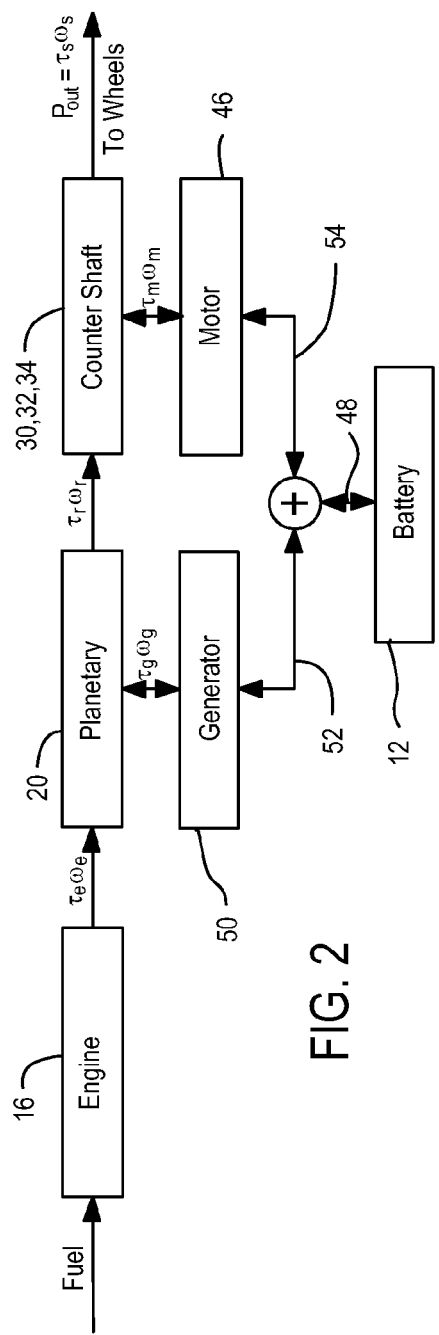
FIG. 2 illustrates a block diagram of the power flow paths for the components of the powertrain shown in FIG. 1.

Referring now to FIG. 2, the power flow paths between the various components of the powertrain of FIG. 1 are shown. Initially, it is noted that fuel is delivered to engine 16 under the control of the driver in known fashion using an engine throttle. Engine power delivered from engine 16 to planetary arrangement 20 is the product $\tau_e \omega_e$, where $\tau_e$ is engine torque and $\omega_e$ is engine speed. Power delivered from planetary arrangement 20 to the counter shaft gears is the product $\tau_r \omega_r$, where $\tau_r$ is the ring gear torque and $\omega_r$ is the ring gear speed. Power out ($P_{out}$) from transmission 14 is the product $\tau_s \omega_s$, where $\tau_s$ and $\omega_s$ are the torque and speed of output shaft 38, respectively.

Generator 50, when acting as a motor, can deliver power to planetary arrangement 20. Alternatively, generator 50 can be driven by planetary arrangement 20, as represented by power flow path 52. Similarly, power distribution between motor 46 and the counter shaft gears can be distributed in either direction, as shown by power flow path 54. Driving power from battery 12 or charging power to battery 12 is represented by the bi-directional arrow 48.

As shown in FIG. 2, engine output power can be split into two paths by controlling the speed of generator 50. The mechanical power flow path ($\tau_r\omega_r$) is from engine 16 to the carrier to the ring gear to the counter shaft. The electrical power flow path ($\tau_g\omega_g$ to $\tau_m\omega_m$) is from engine 16 to generator 50 to motor 46 to the counter shaft. The engine power is split, whereby the engine speed is disassociated from the vehicle speed during a so-called positive split mode of operation. In the positive split arrangement, engine 16 delivers power to planetary arrangement 20, which delivers power to the counter shaft gears 30, 32, 34, which in turn drive wheels 40. A portion of the planetary gearing power is distributed to generator 50, which delivers charging power to battery 12. The speed of generator 50 is greater than zero or positive, and the generator torque is less than zero. Battery 12 drives motor 46, which distributes power to the counter shaft.

If generator 50, due to the mechanical properties of planetary arrangement 20, acts as a power input to planetary arrangement 20 to drive the vehicle, the operating mode is referred to as the so-called negative split mode of operation. In the negative split arrangement, both the generator speed and generator torque are negative. In particular, generator 50 delivers power to planetary arrangement 20 as motor 46 acts as a generator and battery 12 is charging. Under some conditions motor 46 may distribute power to the counter shaft gearing if the resulting torque at wheels 40 from the gearing does not satisfy the driver demand. Then motor 46 must make up the difference.

If generator brake 55 is activated, a parallel operating mode is established. In the parallel operating configuration, engine 16 is on and generator 50 is braked. Battery 12 powers motor 46, which powers the counter shaft gearing simultaneously with delivery of power from engine 16 to planetary arrangement 20 to the counter shaft gearing.

In the power split powertrain of FIG. 1, engine 16 requires either the generator torque resulting from engine speed control or the generator brake torque to transmit its output power through both the electrical and mechanical paths (split modes) or through the all-mechanical path (parallel mode) to the drivetrain for forward motion.

During operation with the second power source (previously described as including battery 12, motor 46, and generator 50), motor 46 draws power from battery 12 and provides propulsion independently from engine 16 to the vehicle for forward and reverse motions. This operating mode is called "electric drive." In addition, generator 50 can draw power from battery 12 and drive against one-way clutch 53 coupling on the engine output shaft to propel the vehicle forward. Generator 50 can propel the vehicle forward alone when necessary. This mode of operation is called generator drive mode.

The operation of the power split powertrain of FIG. 1 integrates the two power sources to work together seamlessly to meet the driver's demand without exceeding the system limits (such as battery limits) while optimizing the total powertrain system efficiency and performance. Coordination control between the two power sources is needed. As shown in FIG. 1, the powertrain includes controller 10 which performs the coordination control. Under normal powertrain conditions, controller 10 interprets the driver demands (e.g., acceleration and deceleration demand), and then determines the wheel torque command based on the driver demand and powertrain limits. In addition, controller 10 determines when and how much torque each power source needs to provide in order to meet the driver's torque demand and achieve the operating point (torque and speed) of the engine.

As indicated above, according to an embodiment of the present invention, an optimal initial distance until charge (DUC) estimation to be used by the battery usage optimization system of a PHEV such as the PHEV of FIG. 1 is made when the vehicle is started after a charge. In general, the initial estimation of the DUC is based on statistical information of distance between charges (DBC). The initial estimation of the DUC is made after each recharge for the battery usage optimization system (i.e., the DBCD control).

Figure 3:
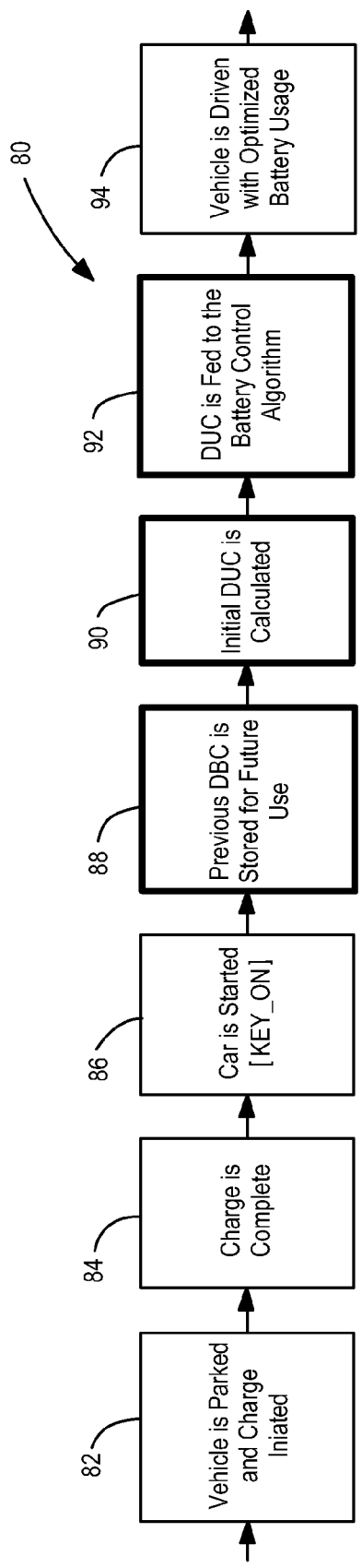
FIG. 3 illustrates a flow diagram describing operation for making an initial distance until charge (DUC) estimation for a PHEV in accordance with an embodiment of the present invention.

Referring now to FIG. 3, a flow diagram 80 describing operation for making an initial DUC estimation for a PHEV in accordance with an embodiment of the present invention is shown. In general, the initial DUC estimation is made by using a prediction system (e.g., a DUC predictor) to (a) collect statistical data about the driving patterns ("data collection"), (b) predict an initial DUC value ("DUC prediction"), and (c) feed the predicted DUC automatically to the battery usage optimization system ("updating the battery usage optimization system") through an arbitration system (e.g., a DBCD arbitrator). Flow diagram 80 shows part of the vehicle usage/charge cycle where blocks 88, 90, and 92 respectively correspond to the three above-noted main objectives (a) data collection, (b) DUC prediction, and (c) updating the battery usage optimization system.

It is noted that it is possible for the driver to interface with the system to enter a default value for the initial DUC as well as for manually updating the DUC. This can be done using the existing human-machine interface (HMI) controls with an addition of a specific menu/configuration entry. Other than that, the system is fully autonomous with respect to the driver.

The operation for making the initial DUC estimation begins with the vehicle being parked and charge being initiated as shown in block 82. Some time after the charge is completed as shown in block 84 the vehicle is started as shown in block 86.

The operation for making the initial DUC estimation then proceeds to block 88 where the previous distance between charges (DBC) is stored in the DUC predictor for future use. Block 88 represents the above-noted (a) data collection objective. For the data collection objective, the data acquisition is adapted to fit the system architecture as data sources may vary across architectures. The data collected will be the data necessary to determine and store the previous distance between charges (DBC), together with time-stamped information on when the last charge was completed. The data is stored in a non-volatile memory using a first-in-first-out (FIFO) buffer approach automatically discarding the oldest values as new values are entered. These stored values are the basis of the optimized DUC calculation which is the subject of block 90.

After the data collection objective of block 88 is finished, the operation for making the initial DUC estimation proceeds to block 90 where the initial DUC is predicted. Block 90 represents the above-noted (b) DUC prediction objective. Each DUC prediction is essentially an average calculation over previous DBC values. However, in order to match the driving patterns of the driver and not let sporadic out-of-pattern trips affect this average, the DBC values to use for this calculation may be selected and/or filtered. The DUC prediction process includes four phases.

Figure 4:
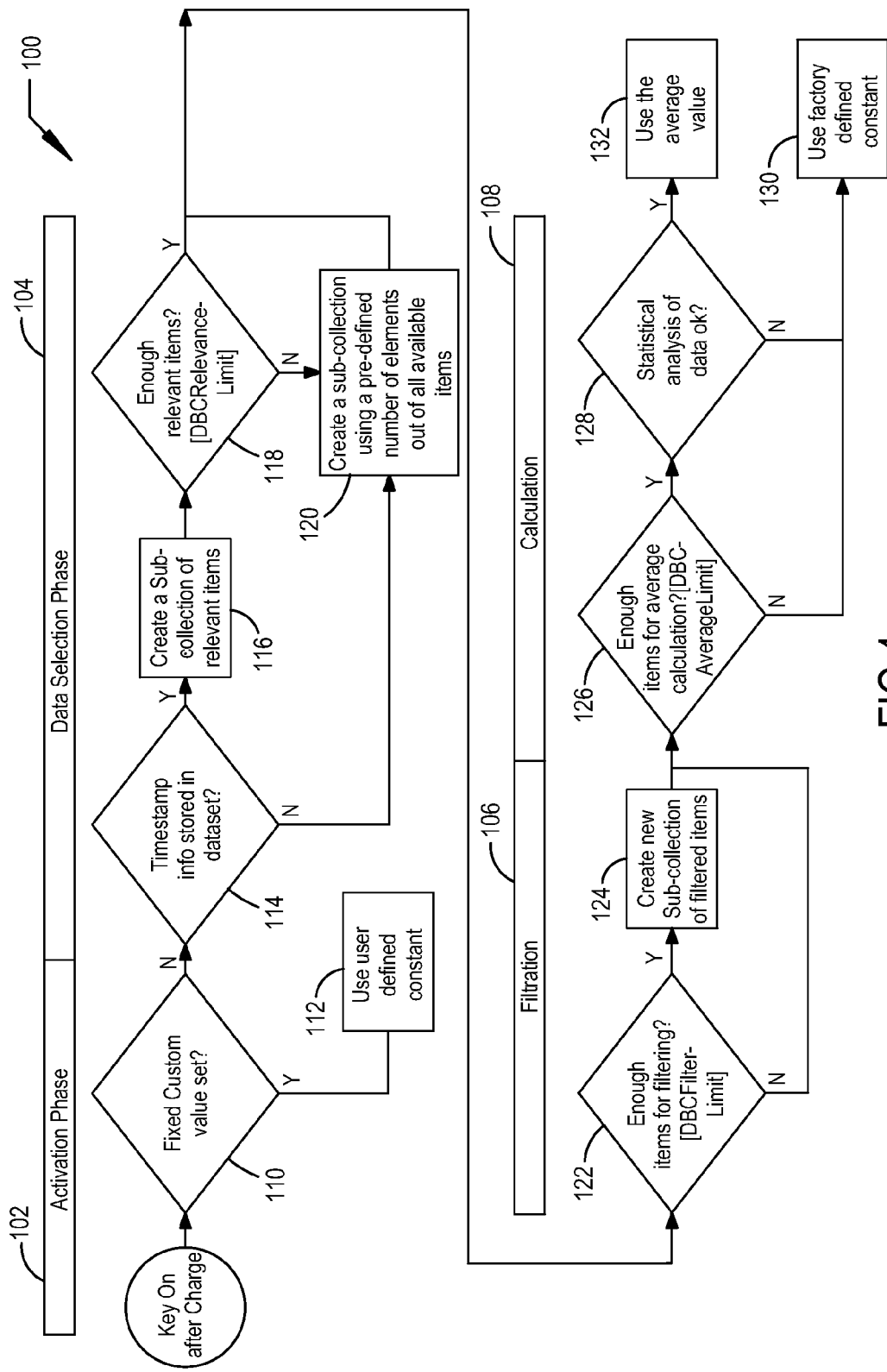
FIG. 4 illustrates a flow diagram describing operation of the optimized DUC calculation in the operation for making an initial DUC estimation shown in FIG. 3.

Turning to FIG. 4, with continual reference to FIG. 3, a flow diagram 100 describing operation of the DUC prediction objective of block 90 is shown. As indicated above, the DUC prediction process includes four phases, which include: activation phase 102, data selection phase 104, filtration phase 106, and calculation phase 108.

During activation phase 102, the DUC predictor checks if a custom default DUC value has been entered by the driver as shown in block 110. If this is the case, then that DUC value is used and no calculation is done as shown in block 112.

During data selection phase 104, a relevant sub-set of the available DBC values are selected. The selection is made such that pattern based selection is utilized to select DBC values that represent previous initiations based on time-of-day and date-of-week as indicated in blocks 114 and 116; e.g., if the vehicle is started on a Wednesday morning at 8:00, the selection could include vehicle starts on weekdays between 7:00 and 9:00. As such, data selection phase 104 allows the DUC to be optimized for different usage patterns depending on driving habits; e.g., standard commuting to work will not be affected by evening trips, and workday habits can be separated from weekend trips.

Data selection phase 104 may include a test to make sure that the smart selection contains enough DBC values to give a significant result as shown in block 118. Otherwise, the selection is discarded and the full sets of stored values are created using all the latest DBC values stored as shown in block 120.

An optimized extension of data selection phase 104 includes an iterative process where the data selection phase is repeated with broader selection criteria until enough DBC values are obtained.

During filtration phase 106, the DUC predictor filters out any trips that stand out from the rest (e.g., by being significantly shorter or significantly longer) as shown in blocks 122 and 124. Filtration phase 106 is performed if the number of elements after filtration is not too few.

During calculation phase 108, the DUC predictor performs an average calculation of the DBC values as well as various statistical tests to see if this calculated average holds a statistically usable result as shown in blocks 126 and 128. If not, then the DUC predictor outputs a default value as the initial DUC value as shown in block 130. Otherwise, the DUC predictor outputs the calculated average DBC value as the initial DUC value as shown in block 132.

The various statistical tests in the foregoing phases are not limited to, but may include, variance and standard deviation (σ-evaluation).

Turning back to FIG. 3, after the DUC prediction objective of block 90 is finished, the operation for making the initial DUC estimation proceeds to block 92 where the DUC predictor feeds the calculated initial DUC to the battery usage optimization system (i.e., the DBCD control), through an arbitration system (e.g., the DBCD arbitrator). Block 92 represents the above-noted (c) updating the battery usage optimization system objective. In turn, the battery usage optimization system uses the calculated DUC from block 90 such that the vehicle is driven with optimized battery usage as shown in block 94.

Each time the vehicle is started (key on) and after a charge has been made, the system can update statistical data and predict a new, more optimized initial DUC value for an imminent trip. This then is fed as the DUC value to the battery usage optimization system as shown in block 92.

As indicated above, according to another embodiment of the present invention, the DUC is dynamically determined and updated while the vehicle is being operated. In general, the DUC is dynamically determined and updated based on driver provided information and/or navigation system information while the vehicle is being operated. This embodiment makes use of the driver being a source of information on how the vehicle is intended to be used. The driver, together with a trip facilitation system such as a navigation system, may communicate with the battery control algorithms to update the battery usage optimization system.

In this embodiment, a mileage gauge is introduced in the human machine interface (HMI) system of the vehicle. The mileage gauge is an inverse trip meter which counts down towards zero and indicates how long a driving distance the PHEV battery is optimized for. That is, the mileage gauge indicates the current distance until charge (DUC). The DUC is a constantly updated metric that reflects how far from the current position that the vehicle is intended to be driven before it receives a recharge.

Once the vehicle is driven farther than the DUC, no PHEV battery capacity will be available and the vehicle will behave as a regular hybrid vehicle. If the vehicle is driven shorter than the DUC, then not all the energy stored in the battery is used and thus a non-optimal fuel economy results.

The driver can change the value of the DUC mileage gauge at any time to indicate the distance the vehicle will be intended to be driven until next charge. The input is limited both upwards and downwards by the HMI. The entered value is forwarded to the DBCD control which ensures that the remaining energy of the PHEV battery is used in an optimal way for that driving distance.

An optional feature is the possibility of reserving part of the battery charge for non-driving purposes (such as an energy source for electric appliances). The driver can enter a value representing a certain amount of the total possible battery charge to be reserved. This is indicated in the HMI and arbitrated to the DBCD control.

If a navigation system is present, information received regarding the distance to destination (D2D) can also be used to update the DUC and keep the battery usage optimal for the whole intended trip.

The DUC mileage gauge can inform the driver if updates to the estimated DUC is no longer possible, which is typically the case when the PHEV battery is almost exhausted.

Figure 5:
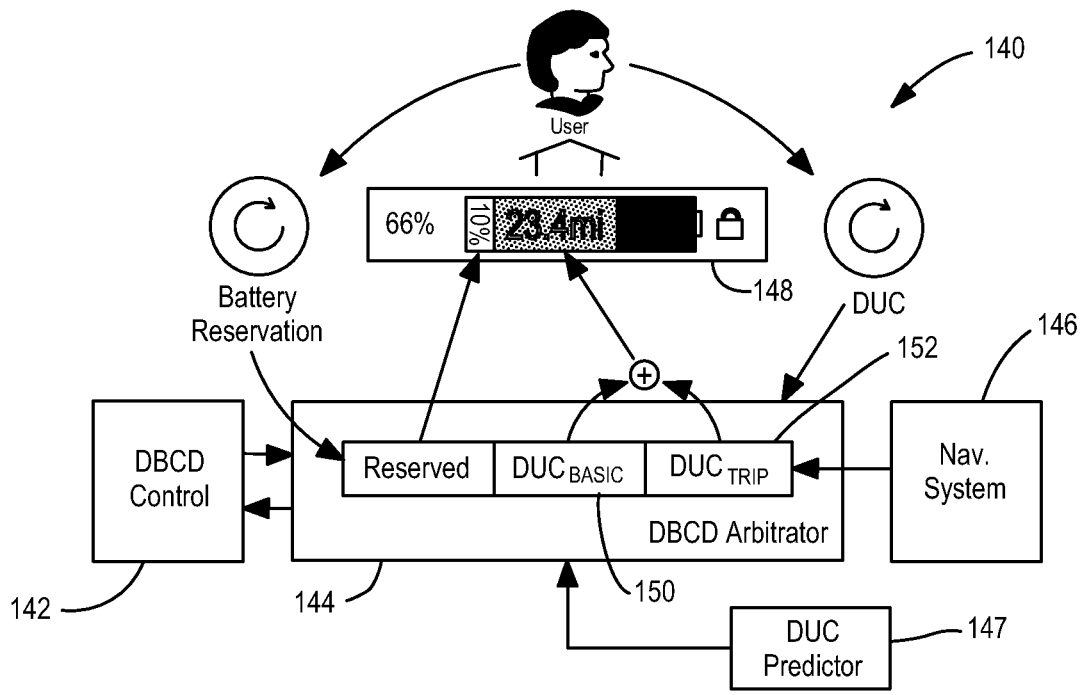
FIG. 5 illustrates a block diagram of a system for dynamically determining and updating the DUC for a PHEV in accordance with an embodiment of the present invention.

Referring now to FIG. 5, a block diagram of a system 140 for dynamically determining and updating the DUC for a PHEV in accordance with an embodiment of the present invention is shown. System 140 includes the battery usage optimization system (i.e., the DBCD control 142). As previously described, DBCD control 142 performs the actual battery optimization.

System 140 further includes the arbitration system (i.e., the DBCD arbitrator 144). DBCD arbitrator 144 interfaces the user (i.e., the PHEV driver) and a navigation system (NAV) 146 of system 140.

System 140 further includes the DUC predictor 147 which performs initial estimations of the DUC value as described above. System 140 further includes a DUC mileage gauge 148 as described above.

DBCD arbitrator 144 constantly outputs the current DUC to DUC mileage gauge 148 for display to the user. DBCD arbitrator 144 also outputs an indication indicative of whether a DUC update is possible to DUC mileage gauge 148 for display to the user.

DBCD arbitrator 144 is also able to interact with the user in order to: (i) allow the user to update the current DUC and enter a new value; (ii) allow the user to update the current battery reservation and enter a new value (this is optional); and (iii) ask if the user would like to extend the current DUC to match a newly planned trip.

The HMI controls used to establish the interface to the user is adapted to the controls available in the PHEV. The intended look-and-feel of this input may be of a "sliding gauge" type or a "volume control". However, due to limitations of the different vehicles, this could include either "virtual" input/output using a touch screen (if available) or input using standard "Info/Setup/Reset" buttons and output using the information text display.

The user interaction may also make use of other future HMI interaction possibilities such as voice update and other new input devices.

The general operation of system 140 will now be described. DBCD arbitrator 144 can operate in two modes, with TRIP activated or not activated. TRIP mode is normally activated when navigation system (NAV) 146 is present, and the user has entered a destination on NAV 146. NAV 146 then constantly informs DBCD arbitrator 144 about the current distance to destination (D2D).

If NAV 146 is not present, or no current destination is activated, then TRIP mode is not active. Under some circumstances described below, the TRIP mode can be off even if a current destination is entered.

DBCD control 142 periodically sends information to DBCD arbitrator 144 with the current DUC value, which is dynamically decreased as the vehicle is driven. DBCD arbitrator 144 uses this information (optionally together with information received from NAV 146) to update DUC mileage gauge 148. Based on user input, or other factors, DBCD arbitrator 144 can then request a new DUC to DBCD control 142, with the new DUC value being used as a base for continued DUC optimizations.

In order to support the required functionality, DUC mileage gauge 148, which the user sees, is represented by two parts internally in DBCD arbitrator 144. These two parts are: $DUC_{BASIC}$ 150 and $DUC_{TRIP}$ 152. The combined total of variables $DUC_{BASIC}$ 150 and $DUC_{TRIP}$ 152 corresponds to the DUC value seen by the user within DUC mileage gauge 148, as well as the DUC value used by DBCD control 142.

Figure 6:
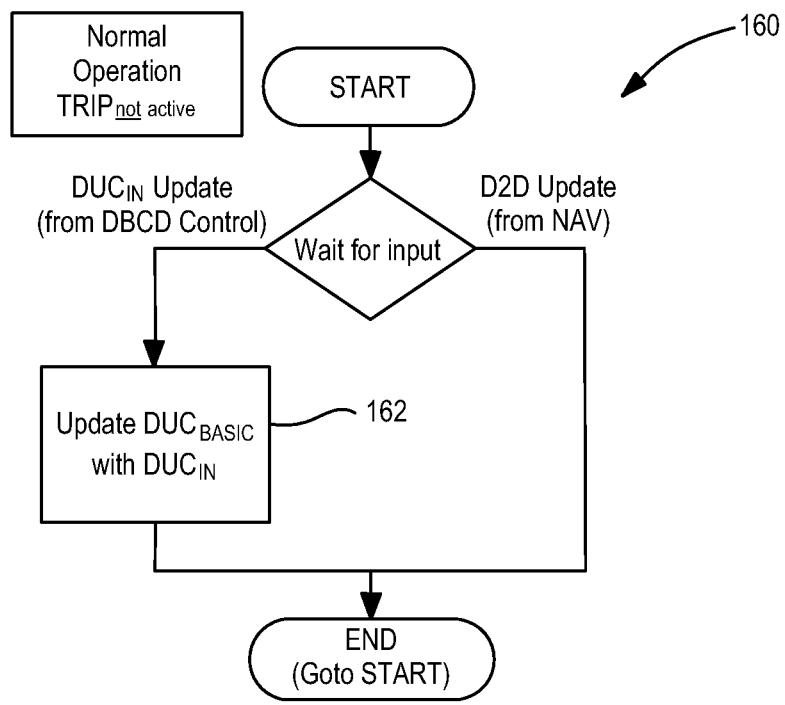
FIG. 6 illustrates a flow diagram describing normal operation of the system shown in FIG. 5 when TRIP mode is not activated.

Referring now to FIG. 6, a flow diagram 160 describing normal operation of system 140 is shown. While TRIP mode is not active, the value of $DUC_{TRIP}$ 152 is zero and the value of $DUC_{BASIC}$ 150 is updated to reflect the information received from DBCD control 142 as shown in block 162. Any information received from NAV 146 is discarded as no active destination is set. As DBCD control 142 decreases the current DUC automatically, DUC mileage gauge 148 decreases in the same rate as the vehicle is driven.

Figure 7:
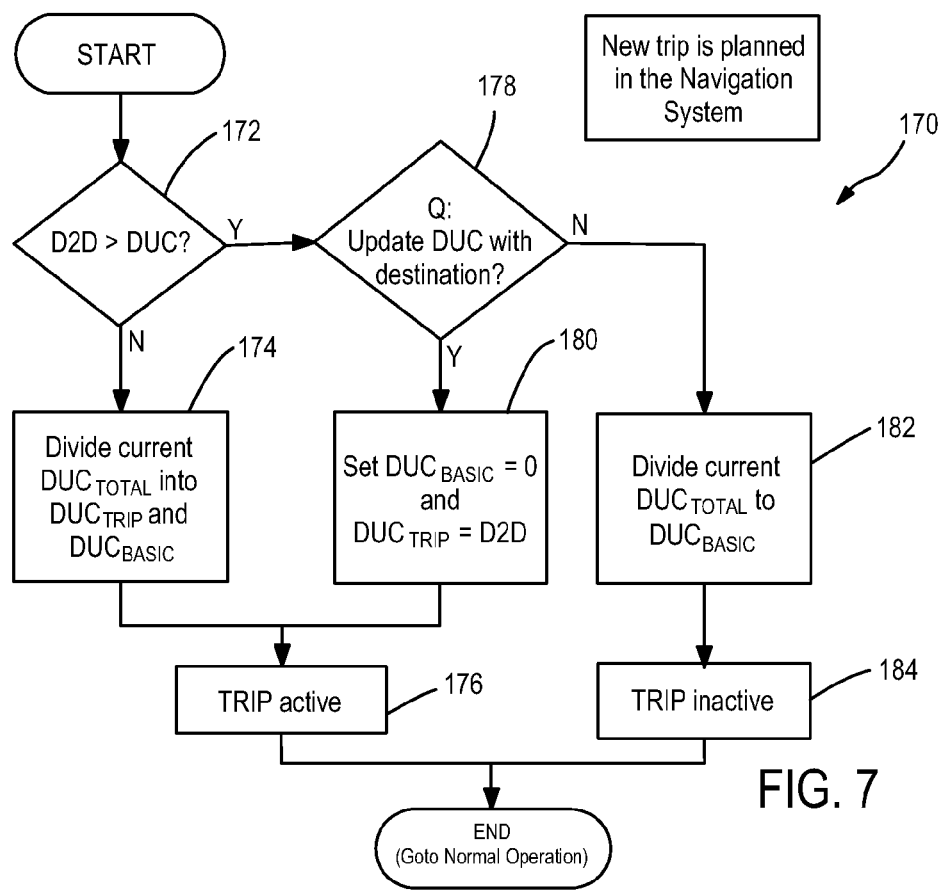
FIG. 7 illustrates a flow diagram describing operation of the system shown in FIG. 5 when a new trip is planned.

Referring now to FIG. 7, a flow diagram 170 describing operation of system 140 when a new trip is planned is shown. When a trip becomes active (i.e. the driver enters a destination in NAV 146), the current total content of DUC mileage gauge 148 is divided between $DUC_{BASIC}$ 150 and $DUC_{TRIP}$ 152. Initially, the distance to destination (D2D) is compared to the current DUC mileage gauge 148 (i.e., the current DUC) as shown in block 172.

If the D2D is smaller than the current DUC, the whole D2D is stored in $DUC_{TRIP}$ 152 and the remainder of the original DUC is stored in $DUC_{BASIC}$ 150 as shown in block 174. $DUC_{BASIC}$ 150 now represents the distance that is left to travel after the vehicle reaches the destination entered into NAV 146. The TRIP mode is then activated as shown in block 176.

If the D2D is longer than the current DUC, the driver is asked whether to extend the DUC to last to the entered destination as shown in block 178. If the driver elects to do so, then the whole D2D is entered into $DUC_{TRIP}$ 152 and $DUC_{BASIC}$ 150 is set to zero as shown in block 180. The TRIP mode is then activated as shown in block 176.

However, if in block 178 the driver elects to not extend the DUC, or if the D2D is larger than the maximum value for the DUC, then system 140 will not be able to use navigation input for battery optimization, and the TRIP mode is inactive as shown in block 184. The current $DUC_{TOTAL}$ or the maximum DUC (depending on the driver's previous input to the extension question) is stored in $DUC_{BASIC}$ 150 and $DUC_{TRIP}$ 152 is set to zero as shown in block 182.

Figure 8:
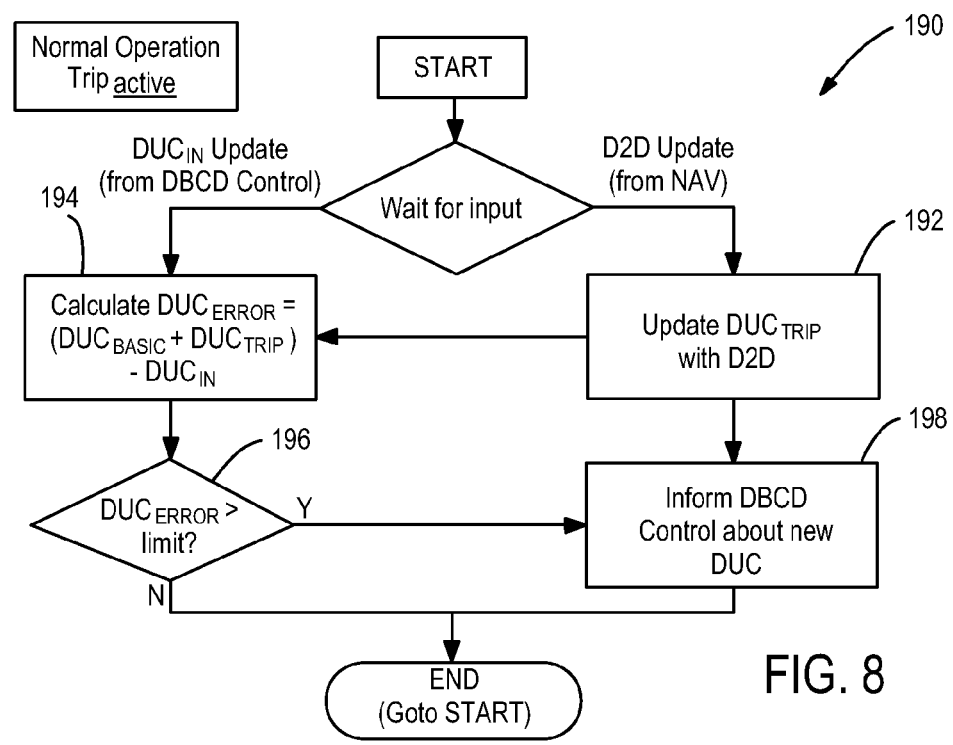
FIG. 8 illustrates a flow diagram describing normal operation of the system shown in FIG. 5 when TRIP mode is activated.

Referring now to FIG. 8, a flow diagram 190 describing normal operation of system 140 during TRIP mode is shown. When TRIP mode is active, the normal operation of system 140 differs a bit from the case when TRIP mode is not active (described with respect to FIG. 6). As $DUC_{BASIC}$ 150 represents the distance that is assumed to be left after the current entered destination has been reached, $DUC_{BASIC}$ 150 is fixed and no longer updated based on inputs from DBCD control 142. Instead, updated distance to destination (D2D) information periodically sent by NAV 146 is stored in $DUC_{TRIP}$ 152 as shown in block 192.

After any kind of update (from either NAV 146 or DBCD control 142), the current $DUC_{TOTAL}$ is compared with the latest DUC received from DBCD control 142 as shown in block 194. If these values are different more than a predetermined amount as shown in block 196, then the new $DUC_{TOTAL}$ is used by DBCD control 142 as shown in block 198.

The reason for this is that normally any detours made during a navigated trip are unplanned and not included in the intended length of the total trip. Therefore, the driver does not want an unplanned detour to affect the total planned distance until next charge. As long as the destination is active, DBCD arbitrator 144 only updates $DUC_{TRIP}$ 152 to match the D2D, making sure that the extended distance the vehicle can travel, once it reaches the destination, will be the same.

If for any reason the current navigation destination is cancelled or inactivated, the current $DUC_{TOTAL}$ is stored in $DUC_{BASIC}$ 150, $DUC_{TRIP}$ 152 is reset to zero, and the TRIP mode is deactivated.

Figure 9:
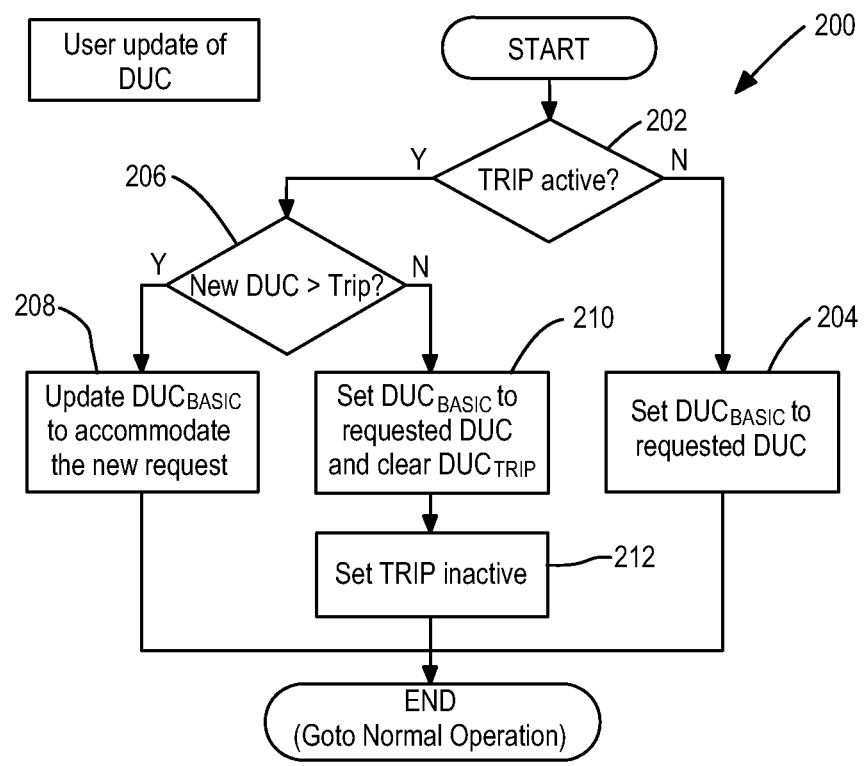
FIG. 9 illustrates a flow diagram describing operation of the system shown in FIG. 5 in response to user update of the DUC.

Referring now to FIG. 9, a flow diagram 200 describing operation of system 140 in response to user update of the DUC is shown. Initially, a determination is made as to whether TRIP mode is active as shown in block 202. If the driver enters a new DUC when TRIP mode is not active, then this new DUC is stored in $DUC_{BASIC}$ 150 and used by DBCD control 142 as shown in block 204 (as TRIP mode is not active, $DUC_{TRIP}$ 152 is set to zero).

If the driver modifies the DUC while the TRIP mode is active, then DBCD arbitrator 144 calculates whether the newly requested DUC is larger than the current trip distance as shown in block 206. If yes, then only $DUC_{BASIC}$ 150 is updated such that the sum of $DUC_{BASIC}$ 150 and $DUC_{TRIP}$ 152 equals the requested total as shown in block 208. DBCD arbitrator 144 continues to operate in the TRIP mode.

If in block 206 the newly requested DUC is shorter than the D2D, the whole requested DUC is stored in $DUC_{BASIC}$ 150 and $DUC_{TRIP}$ 152 is reset to zero as shown in block 210. The TRIP mode is then turned off as shown in block 212. DBCD arbitrator 144 now continues to run in normal mode.

As described, a summary of features of dynamically determining and updating the DUC while a PHEV is being operated in accordance with an embodiment of the present invention includes the following. A PHEV having a DUC mileage gauge which is continuously updated (the DUC mileage gauge is normally decreasing). A PHEV having a single distance gauge which the driver may use to control the DUC. The single distance gauge may be controlled in a manner similar to controlling a volume button. An optional control may be provided for the reserved battery power gauge. A user-experienced single "DUC" with two different internal values in order to be able to support both "driven distance" (from DBCD control 142) and "predicted distance" (from NAV 146) updates. The logic to update the DUC, how and when to activate/deactivate the TRIP mode, and how to handle the combined available distance information are also features.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed:

1. A method for controlling an electric vehicle, the method comprising:
   after the vehicle is recharged, estimating, by a vehicle system controller, a distance until charge (DUC) value based on historical distance between charges (DBC) values each indicative of the distance the vehicle has been driven between a respective pair of consecutive charges of the vehicle; and
   controlling battery usage of the vehicle as a function of the DUC value.

2. The method of claim 1 wherein:
   estimating the DUC value is done upon the vehicle being started after being recharged.

3. The method of claim 1 wherein:
   the DUC value is estimated as being the average of the DBC values.

4. The method of claim 1 further comprising:
   receiving a DUC value from a user of the vehicle; and
   updating the DUC value to be the DUC value received from the user of the vehicle.

5. The method of claim 1 further comprising:
   receiving a DUC value from a user of the vehicle;
   wherein controlling battery usage of the vehicle is done as a function of the DUC value received from the user in place of DUC value based on the DBC values.

6. The method of claim 1 further comprising:
   filtering the DBC values to remove therefrom any of the DBC values which deviates from the remaining DBC values by more than a predetermined degree;
   wherein the DUC value is estimated based on the filtered DBC values.

7. The method of claim 6 wherein:
   the DUC value is estimated as being the average of the filtered DBC values.

8. The method of claim 1 further comprising:
   obtaining temporal information indicative of when each of the consecutive charges occurred;
   wherein the DUC value is estimated based on the DBC values corresponding to a selected temporal pattern.

9. A method comprising:
   after an electric vehicle is recharged, estimating, by a controller, a distance until charge (DUC) value based on historical distance between charges (DBC) values each indicative of distance the vehicle has been driven between a respective pair of consecutive charges of the vehicle in which the initial one of the consecutive charges occurred temporally corresponding to when the vehicle was recharged;
   controlling battery usage of the vehicle based on the DUC value.

10. The method of claim 9 further comprising:
    decreasing the DUC value as the vehicle is driven over a distance to a new current position from the previous current position; and
    displaying the DUC value on a mileage gauge of the vehicle for the user to see as the DUC value decreases.

11. The method of 9 further comprising:
    after the vehicle has been driven a distance, receiving from a user, at an interface of the vehicle, a new DUC value indicative of the distance from a new current position that the vehicle is intended to be driven before the vehicle is recharged; and
    controlling battery usage of the vehicle as a function of the new DUC value in place of the previous DUC value.

12. The method of claim 11 wherein:
    the user is the driver of the vehicle.

13. The method of claim 9 further comprising:
    receiving from a user, at an interface of the vehicle, a reservation value indicative of battery charge to be reserved;
    wherein battery usage of the vehicle is controlled as a function of the DUC value and the reservation value.

14. The method of claim 9 further comprising:
    receiving from a user, via a navigation system of the vehicle, a distance to destination value indicative of the distance from a current position to a destination position that the vehicle is intended to be driven to;
    receiving from a user an indication that the destination position is where the vehicle is intended to be driven before the vehicle is recharged;
    determining a new DUC value as being the distance to destination value; and
    controlling battery usage of the vehicle as a function of the new DUC value in place of the previous DUC value.

15. A system for controlling an electric vehicle, the system comprising:
    a controller; and
    an arbitrator in communication with the controller, the arbitrator configured to receive from a user of the vehicle a distance until charge (DUC) value indicative of the distance from a current position that the vehicle is intended to be driven before the vehicle is recharged;
    wherein the controller is configured to control battery usage of the vehicle as a function of the DUC value;
    a prediction system in communication with the arbitrator, the prediction system configured to estimate, after the vehicle is recharged, the DUC value based on historical distance between charges (DBC) values each indicative of the distance the vehicle has been driven between a respective pair of consecutive charges of the vehicle;
    wherein the controller is further configured to control battery usage of the vehicle as a function of the estimated DUC value until the arbitrator receives a DUC value from a user of the vehicle.

16. The system of claim 15 further comprising:
    a mileage gauge in communication with the arbitrator;
    wherein the controller is further configured to decrease the DUC value as the vehicle is driven over a distance to a new current position from the previous current position;
    wherein the mileage gauge is configured to display the DUC value for the user to see as the DUC value decreases.

17. The system of claim 15 further comprising:
    a navigation system in communication with the arbitrator, the navigation system configured to receive from a user a distance to destination value indicative of the distance from a current position to a destination position that the vehicle is intended to be driven to;

wherein the arbitrator is further configured to receive from a user an indication that the destination position is where the vehicle is intended to be driven before the vehicle is recharged and to determine a new DUC value as being the distance to destination value;

wherein the controller is further configured to control battery usage of the vehicle as a function of the new DUC value in place of the previous DUC value.

18. The system of claim 15 further comprising:

a navigation system in communication with the arbitrator;

wherein the arbitrator is further configured to operate in a TRIP mode and a non-TRIP mode and is further configured to internally represent the DUC value as the sum of a basic value and a trip value;

wherein the arbitrator is further configured to set the basic value to the DUC value and to set the trip value to zero while the arbitrator is in the non-TRIP mode;

wherein the arbitrator is further configured to set the trip value to a distance to destination (D2D) value indicative of the distance from a current position to a destination position that the vehicle is intended to be driven to upon the D2D value being entered into the navigation system and to set the basic value to be equal to the difference of the DUC value and the D2D value while arbitrator is in the TRIP mode.

* * * * *